Patented Oct. 30, 1928.

1,690,020

UNITED STATES PATENT OFFICE.

LESTER KIRSCHBRAUN, OF CHICAGO, ILLINOIS.

PAVEMENT AND PROCESS OF LAYING SAME.

No Drawing. Application filed May 26, 1920. Serial No. 384,258.

This invention relates particularly to a combined bituminous and concrete pavement.

Among the salient objects of this invention are to provide a construction in which the bituminous wearing surface is integrally bonded and united with the concrete base, the bonding action taking place before the concrete has set; to provide a construction in which the stones of the wearing surface are partially embedded in and held in place by both the concrete base and the bituminous wearing surface; to provide a bituminous wearing surface which is extremely malleable and has maximum shock absorbing ability, yet is not liable to displacement due to the anchorage of the large particles of its mineral aggregate in the concrete base; to provide a bituminous wearing surface which may become adhesively united to the concrete base, the whole structure while having the rigidity and strength, nevertheless, possesses, the advantages of a resilient or non-abrasive wearing surface, due to my novel bituminous composition and method of applying same.

The process of laying the pavement may be described as follows:

A Portland cement concrete foundation is laid in the usual manner. Upon this concrete foundation while the same is still plastic and before it has time to set, there is applied a bituminous surfacing composed of an emulsified mixture of water, clay and bitumen to which may be added, if desired, a fibrous or other reinforcement.

The bituminous surfacing may be prepared as follows: Clay containing colloidal particles is mixed with preferably hot water to form a viscous, mud-like mixture. Care must be taken that all the particles which are susceptible of action by water are broken down by thorough mixing and agitation. To this mixture there is added bitumen such as asphalt in a heated liquid condition. Preferably this asphalt would be of a rather soft nature of say approximately 100 penetration for moderate conditions of traffic, although this will vary as will be understood by those skilled in the art, for various climatic and traffic conditions. In any event, the bitumen must be of such a character that upon the evaporating of the moisture, it will readily flow so as to coalesce under normal atmospheric temperature conditions. The asphalt is gradually poured into the aqueous mixture in such a way as to form a stiff emulsion in which the water forms the external phase and the bitumen the internal phase.

It is to be noted that the asphalt should be poured into the clay and not the clay into the asphalt, in order to accomplish the desired emulsion and prevent the inversion of the above phases. Preferably the asphalt should be heated to a temperature of 300° F. to 400° F. as it is poured into an aqueous mixture—this elevated temperature being desirable in order to effect the most complete dispersion of the asphalt with the clay and water. The mixing operation is best effected or may be carried out in a double pug mill mixer. The fact that the clay may contain sand or other mineral particles will not necessarily prevent its being used. The following proportions by weight may be used: Clay 60; water 25; asphalt 15 parts. The clay is the major portion of the emulsion. This emulsion may be then spread cold by rakes or templets over the wet concrete foundation. It is desirable that as the emulsion is being raked or spread, the rakes enter the wet concrete and more or less mix the concrete and bituminous emulsion together.

By this method, the laitance which prevents the adhesion of bitumen to concrete is removed and the surface of the foundation put in prime condition for permitting adhesion of bitumen. Necessarily also, water contained in the external phase of the emulsion serves to delay the evaporation of water from the concrete base, and thereby assists in curing the wet concrete foundation.

After this wearing surface has been spread, I take stone of suitable size depending on the thickness of the wearing surface, as for example, 1½" stone with a 1" wearing surface and spread this stone evenly over the wet bituminous mixture and force it through the mixture by means of tampers or light rollers until the stone has penetrated through the bitumen and become partially embedded into the concrete base. The concrete base is allowed to set and the water evaporates, the bitumen coalesces and the pavement is then open to traffic. If desired, with the emulsion may be mixed a fibrous constituent as for example, paper stock, vegetable or mineral fibres, sawdust or the like.

By the expression "inert emulsifying agent" as used in the claims, I intend to include emulsifying agents which, as in the case of the clay referred to herein, are inert towards and are not reacted upon by the alkaline constituents of the concrete foundation, so that the emulsion will retain its stability and not be broken by such constituents when applied to the concrete foundation in accordance with the present invention.

I claim as my invention:

1. A process of forming a pavement, comprising laying a concrete foundation, applying an emulsified mixture of bitumen in water and containing an inert emulsifying agent to the concrete base while the latter is still plastic to form a unitary structure by combination of the miscible substances.

2. A process of forming a pavement consisting in laying a concrete foundation, making an emulsified mixture of bitumen, clay containing colloidal particles and water, applying this mixture to the concrete base while the latter is still plastic, partially mingling the particles of the emulsified mixture with the base while both are in a miscible form.

3. A process of forming a pavement, comprising laying a concrete foundation and while the same is still unset, uniting therewith a wearing surface comprising a stable bituminous emulsified mixture containing an inert emulsifying agent maintained in an aqueous vehicle and broken stone, imbedding the stone in both the wearing surface and the base so that it forms a bond between the concrete foundation and the wearing surface, and producing a unitary structure with the union of the miscible substances in the base and wearing surface, and cohesion of the bitumen.

4. A process of forming a pavement comprising laying a concrete foundation, spreading over said foundation while the latter is still plastic, a wearing surface comprising a stable bituminous emulsion, and thereafter forcing broken stone through said surface and partially into said foundation.

5. The process of forming a pavement consisting in laying a concrete foundation, superposing over said foundation while the latter is still plastic an emulsified mixture of bitumen in water and containing an inert emulsifying agent, and thereafter forcing mineral aggregate through the wearing surface and partially into the still plastic base and then allowing the entire pavement to set, the water to evaporate and the bitumen to coalesce.

6. A process of forming a pavement comprising laying a concrete foundation, applying over such foundation while the latter is still plastic, an emulsion of bitumen in water and containing an emulsifying agent inert toward the alkaline constituents of said foundation.

7. In the art of laying pavements and the like wherein a layer of cementitious material is employed, the improvement which consists in applying to such cementitious layer while the same is in a plastic state and before it has had time to set, a coating of an emulsified material substantially free of crushed stone and containing an emulsifying agent, water and bituminous particles to remain on the cementitious layer during evaporation of water in the emulsion, thereby causing the bituminous particles to coalesce and adhesively unite to the cementitious layer before the latter sets.

8. In a process for laying pavements and the like having a cementitious base, the step of applying to such cementitious base before it has had time to set a layer of bituminous emulsion, substantially free of crushed stone and containing water to remain on the base during evaporation of water therein to cause the bituminous particles to coalesce and become adhesively united to such base before the latter sets.

9. In a process for laying pavements and the like having a cementitious base, the step of applying to such cementitious base before it has had time to set a layer of non-adhesive bituminous emulsion, substantially free of crushed stone and containing water and a colloidal emulsifying agent to remain on the base during evaporation of water therein to cause the bituminous particles to coalesce and become adhesively united to such base before the latter sets.

10. In a process of producing products containing a layer of cementitious material, the improvement consisting in applying to a surface of such a cementitious layer before it has had time to set a coating of an emulsion, substantially free of crushed stone and containing an emulsifying agent, water and bituminous particles to remain on such layer during evaporation of water contained in the emulsion to cause the bituminous particles therein to coalesce and adhesively unite to the surface of the base before the latter sets.

LESTER KIRSCHBRAUN.